United States Patent [19]

Tsuruoka et al.

[11] 4,402,130

[45] Sep. 6, 1983

[54] METHOD FOR CONNECTING ARMATURE COIL TO COMMUTATOR SEGMENT

[75] Inventors: Kazuhiro Tsuruoka; Hisanobu Kanamaru, both of Katsuta, Japan

[73] Assignee: Hitachi, Ltd., Tokyo, Japan

[21] Appl. No.: 285,636

[22] Filed: Jul. 21, 1981

[30] Foreign Application Priority Data

Jul. 21, 1980 [JP] Japan .................................. 55-98816

[51] Int. Cl.³ ...................... H01R 43/04; H01R 43/06
[52] U.S. Cl. ....................................... 29/597; 310/234
[58] Field of Search ......................... 29/598, 597, 509; 310/234, 233, 236, 71

[56] References Cited

U.S. PATENT DOCUMENTS 2,476,795  7/1949  Avigdor ........................... 29/597 X
2,572,956  10/1951  Servis ................................. 29/597
3,095,103  7/1962  Warner .............................. 29/597

Primary Examiner—Carl E. Hall
Attorney, Agent, or Firm—Antonelli, Terry & Wands

[57] ABSTRACT

A commutator including commutator segments each having a stepped portion formed at the bottom of a slot which is formed at one end of the commutator segment and into which portions of armature coils are inserted, to prevent axial escapement of the armature coils. A lower coil of the armature coils is plastically deformed to conform to the contour of the stepped portion and outer surface of an upper coil of the armature coils is plastic-deformed together with the commutator segments by pressing the edge of the opening of the slot to couple the armature coils to the commutator segments.

7 Claims, 16 Drawing Figures

METHOD FOR CONNECTING ARMATURE COIL TO COMMUTATOR SEGMENT

BACKGROUND OF THE INVENTION

The present invention relates to a method and a structure of a commutator segment for connecting armature coils to commutator segments, and more particularly to a commutator in which conductors are physically connected by plastic-deforming components of an armature.

A typical method for plastic-deforming the components of the armature to physically connect the conductors is disclosed in Japanese Patent Application Laid-open No. 131705/79. In the disclosed method, in the inner walls of a slot of each commutator segment, to which the sides of an upper armature coil oppose, axially extending recesses are formed, and the upper coil is radially pressed to cause a plastic flow thereof into the recesses and to couple it to a lower coil. However, since the lower coil is mounted on the flat base of the slot, a sufficient stress is not applied to the lower coil when the upper coil is pressed and hence the slot is not filled. As a result, a contact resistance between the conductors increases, which is disadvantageous in electrical sense. Although coil material entered into the recesses of the inner wall of the slot provides a sufficient force to prevent a radial escapement of the armature coil, a force to prevent an axial escapement of the armature coil results from only friction forces between the coils and the commutator segment and between the coils. Accordingly, a sufficient mechanical strength is not attained.

SUMMARY OF THE INVENTION

It is an object of the present invention to produce a method and a commutator which allows positive coupling of armature coils to commutator segments by simple cold caulking.

In accordance with the present invention, there is provided a commutator of a rotor of a D.C. rotary machine in which armature coils are inserted into slots formed in commutator bars or commutator risers, wherein stepped portions for preventing an axial escapement of the armature coils are formed at bottoms of the slots, and portions of the armature coils inserted into the slots are pressed to plastically-deform them to conform to the contour of the stepped portion of the bottom of the slot and to plastically-deform opening edges of the slots of the commutator bars or the commutator risers and to hold outer surfaces of the inserted portions of the armature coils by the deformed opening edges.

Preferably, after the armature coils have been inserted into the slots, the inserted portions of the armature coils are pressed and plastically-deformed by punches having a narrower width than the slot width and then the opening edges of the slots are pressed and plastically-deformed by punches having a wider width than the slot width. The plastic deformation is carried out in a cold condition to accomplish strong mechanical bonding.

According to the present invention, the armature coils can be positively coupled to the commutator in a cold condition so that the effects of heat are completely avoided. In addition, by the stepped portions of the slots, the axial movement of the coil is perfectly prevented.

DETAILED DESCRIPTION OF THE PREFERRED EMBODIMENTS

Figure 1:
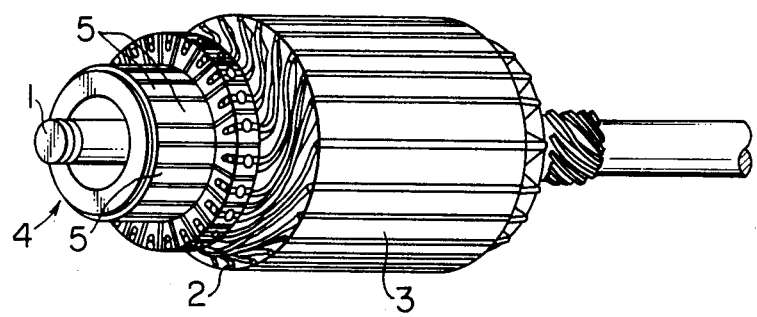
FIG. 1 shows a perspective view of a rotor of a D.C. rotary machine to which the present invention is preferably applied.
Figure 2:
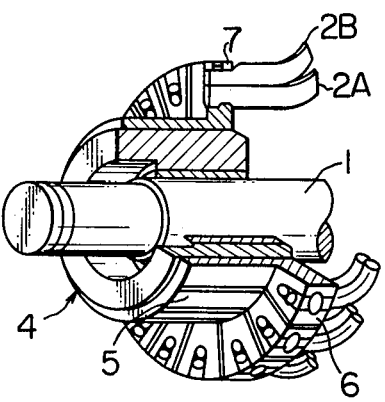
FIG. 2 shows a perspective view, partly in section, of a major portion of the rotor shown in FIG. 1.
Figure 3:
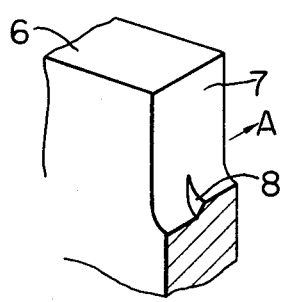
FIG. 3 shows a perspective view, partly in section, illustrating the contour of a slot in a riser of the rotor shown in FIG. 2.
Figure 4:
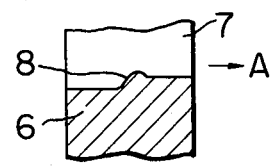
FIG. 4 shows an axially sectional view of a slot shown in FIG. 3.
Figure 5:
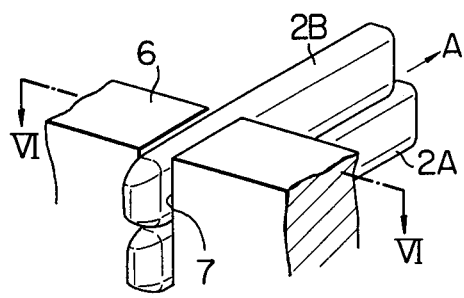
FIG. 5 shows a perspective view illustrating portions of armature coils inserted into the slot.

As shown in FIG. 1, laminated core 3 on which armature coils 2 are wound is fixed to a rotary shaft 1. One end of the armature coils 2 is connected to commutator segments of a commutator generally designated by the reference numeral 4 which is press-inserted to the rotary shaft 1. As seen from FIG. 2, such connection is carried out under application of a press force after a lower coil 2A and an upper coil 2B have been inserted into a slot 7 of a riser 6 which is formed integrally with a commutator bar 5. At bottom of each slot 7, a stepped portion 8 for preventing an axial escapement of the armature coils 2 is formed as shown in FIGS. 3 to 5, in which an arrow A shows the direction of escapement of the armature coils. The stepped portion 8 may be readily formed by plastically-deforming the bottom of the slot 7 in a cold condition.

Figure 6:
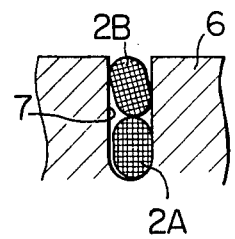
FIG. 6 shows a sectional view taken along a line VI—VI in FIG. 5.
Figure 15:
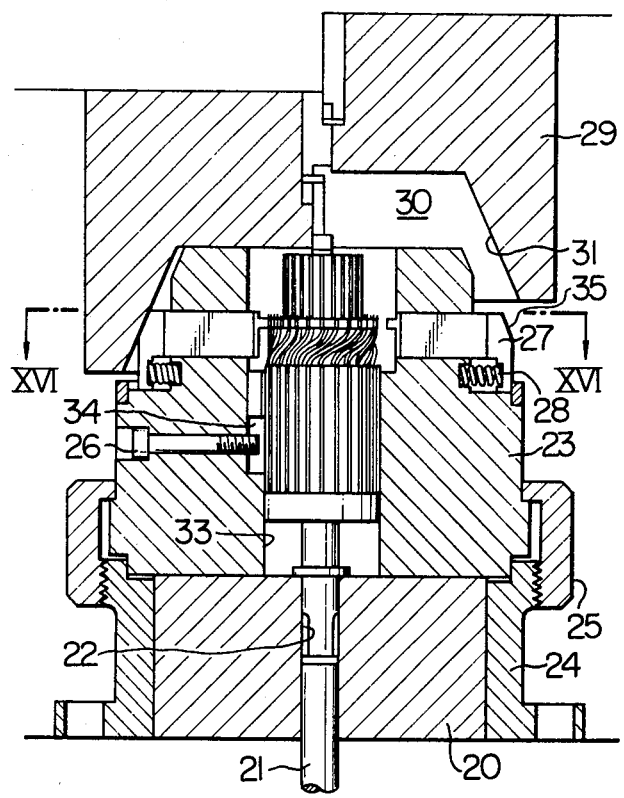
FIG. 15 shows a longitudinally sectional view of a pressure applying device used for effecting the coil connection in accordance with the present invention.
Figure 16:
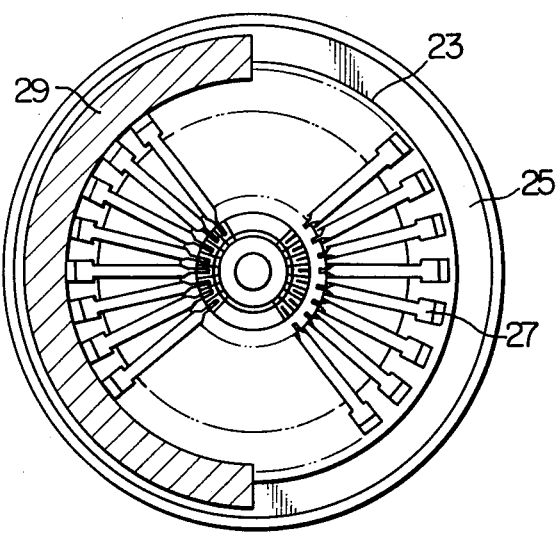
FIG. 16 shows a sectional view taken along a line XVI—XVI in FIG. 15.

After the upper coil 2B and the lower coil 2A of the armature coils 2 have been inserted into the slot 7, as shown in FIGS. 5 and 6, the assembly is placed in a device shown in FIG. 15 and the coils 2A and 2B are press-inserted into the slot 7 by actuation of the device. A base 20 of the device is formed with a rotary shaft reception hole 22 having a center knock-out pin 21, and a die 23 for holding the laminated core 3 is mounted on the base 20. The base 20 and the die 23 are coupled together by a fixture 24 and a ring nut 25. A hollow portion 33 is formed at the center of the die 23 to hold the core 3. A portion of an inner wall of the hollow portion 33 has a key 34 having a contour to conform to the slot 7 to prevent the rotation of the armature coil 3. The key is fixed by a screw 26 extending from an outer periphery to allow replacement. Punches 27, equal in number to the slots 7, are provided at the top of the die 23 to radially extend through the die 23 as shown in FIG. 16. The punches 27 have tapered portions 35 at their outer peripheries and they are normally retained in home positions by return springs 28. The punches 27 are actuated by a slider 29 located at the top. A bottom surface of the slider 29 defines a frusto-conical space 30 so that the punches 27 are moved laterally as the tapered portion 31 moves vertically.

Figure 7:
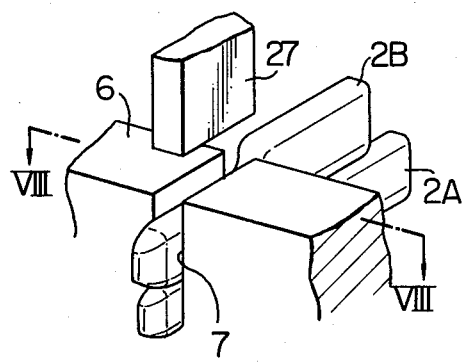
FIG. 7 shows a perspective view illustrating a step for pressing armature coils onto the bottom of the slot to plastically-deform it in accordance with the present invention.
Figure 8:
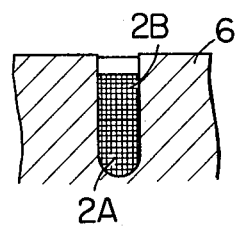
FIG. 8 shows a sectional view taken along a line VIII—VIII in FIG. 7.

When the upper and lower coils 2B and 2A of the armature coils 2, aligned in the slots 7 as shown in FIGS. 5 and 6, are pressed by the punch 27 shown in FIG. 15, they are fully filled in the slot 7 as shown in FIGS. 7 and 8 and the lower coil 2A engages with the stepped portion 8. After this step, a second coupling step is carried out by using a similar device.

Figure 9:
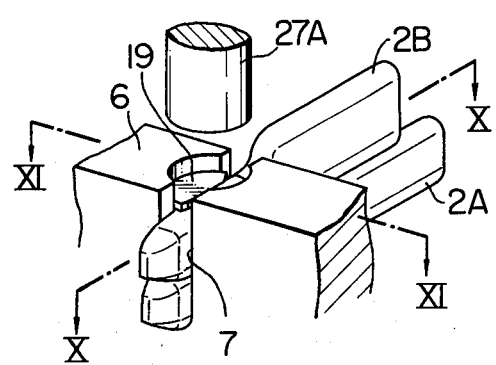
FIG. 9 shows a perspective view illustrating a step for deforming the opening edge of the slot.
Figure 10:
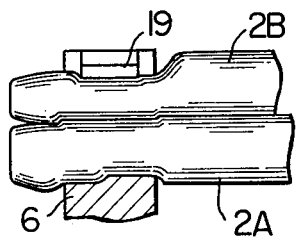
FIG. 10 shows a sectional view taken along a line X—X in FIG. 9.
Figure 11:
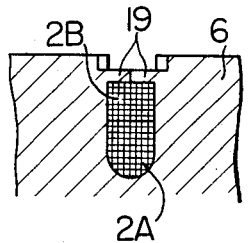
FIG. 11 shows a sectional view taken along a line XI—XI in FIG. 9.

In this second coupling step, punches 27A of cylindrical shape are used as shown in FIG. 9, each having a sectional area having a larger diameter than the width of the opening of the slot 7. Consequently, the punch 27A presses and plastically-deforms the edge of the opening of the slot 7 to bring the upper and lower coils 2B and 2A into close contact with each other and at the same time to fix the upper coil 2B as well as lower coil 2A in the slot 7 by the deformed area 19 as shown in FIGS. 10 and 11. In this manner, the lower coil 2A and the upper coil 2B are held and fixed between the bottom of the slot 7 and deformed area 19. Thus, the armature coils are firmly fixed to the riser 6 both electrically and mechanically.

Figure 12:
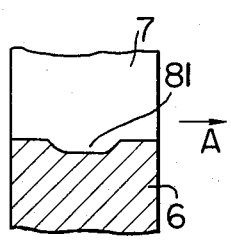
FIG. 12 shows an axially sectional view illustrating a modification of a stepped portion of the bottom of the slot.
Figure 13:
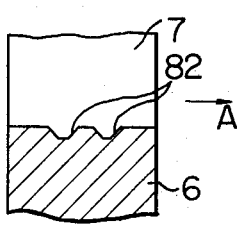
FIG. 13 shows an axially sectional view illustrating another modification of the stepped portion of the bottom of the slot.
Figure 14:
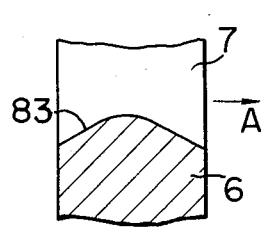
FIG. 14 shows an axially sectional view illustrating a further modification of the stepped portion of the bottom of the slot.

FIGS. 12 to 14 show modifications of the contour of the bottom of the slot 7.

In FIG. 12, a recessed portion 81 is formed at the bottom of the slot 7 to prevent the escapement of the armature coil in the direction of the arrow A.

In FIG. 13, a plurality of stepped portions 82 are formed at the bottom of the slot 7 to form a plurality of escapement prevention portions.

In FIG. 14, the bottom of the slot has a relatively gentle convex contour to form an escapement prevention portion.

The pressing step by the punches 27 and the deforming step by the punches 27A may be simultaneously carried out by employing punches of appropriate structure.

What is claimed is:

1. A method for connecting armature coils to commutator segments the method comprising the steps of:
   forming a stepped portion to prevent axial escapement of said armature coils at a bottom of a slot formed in each of said commutator segments,
   inserting portions of said armature coils into the slot,
   pressing inserted portions of said armature coils to plastically deform a lower coil of said armature coils to conform to a contour of said stepped portion at the bottom of the slot, and then
   pressing-deforming an edge of an opening at the top of said slot to bring an upper and the lower coil of said armature coils into close contact with each other and to fix the upper and lower coils in the slot by a deformed area of the opening.

2. A method for connecting armature coils to commutator segments according to claim 1, wherein the step of pressing inserted portions of the armature coils includes pressing and plastically-deforming the inserted portions by punches having a narrower width than a width of the slot, and wherein the step of press-deforming an edge of said opening includes pressing and plastically-deforming by punches having a width wider than the width of the slot.

3. A method for connecting armature coils to commutator segments according to claim 1, wherein said inserted portions of said armature coils are simultaneously pressed by a plurality of radially arranged punches.

4. A method for connecting armature coils to commutator segments according to claim 1, wherein the step of forming a stepped portion at a bottom of the slot includes plastically deforming the bottom of the slot in a cold condition.

5. A method for connecting armature coils according to claim 1, wherein the step of forming a stepped portion at a bottom of the slot includes plastically deforming the bottom of the slot in a cold condition so as to provide at least one recessed portion substantially in a central area of the slot.

6. A method for connecting armature coils according to claim 1, wherein the step of forming a stepped portion at a bottom of the slot includes plastically deforming the bottom of the slot in a cold condition so as to provide a plurality of stepped portions spaced from each other in an axial escapement direction of said armature coils.

7. A method for connecting armature coils according to claim 1, wherein the step of forming a stepped portion in a bottom of the slot includes plastically deforming the bottom of the slot in a closed condition to provide a relatively gentle convex contour substantially in a central area of the slot.

* * * * *